United States Patent
Caldwell

(10) Patent No.: US 7,155,858 B2
(45) Date of Patent: Jan. 2, 2007

(54) TROTLINE LEADER SYSTEM

(76) Inventor: William Alfred Caldwell, 603 W. Forest Ave., Girard, KS (US) 66743-1420

( * ) Notice: Subject to any disclaimer, the term of this patent is extended or adjusted under 35 U.S.C. 154(b) by 51 days.

(21) Appl. No.: 10/979,615

(22) Filed: Nov. 2, 2004

(65) Prior Publication Data
US 2005/0091908 A1    May 5, 2005

Related U.S. Application Data

(60) Provisional application No. 60/517,008, filed on Nov. 4, 2003.

(51) Int. Cl.
A01K 91/18 (2006.01)
A01K 91/04 (2006.01)

(52) U.S. Cl. ............ 43/27.4; 43/42.74; 43/44.83; 43/44.84; 24/908

(58) Field of Classification Search ............ 43/27.4, 43/42.74, 44.83, 44.84, 44.85; 24/908
See application file for complete search history.

(56) References Cited

U.S. PATENT DOCUMENTS

| | | | | |
|---|---|---|---|---|
| 542,803 A * | 7/1895 | Palmer | ...... | 43/44.84 |
| 578,248 A * | 3/1897 | Layne | ...... | 43/27.4 |
| 843,748 A * | 2/1907 | Harris | ...... | 43/44.85 |
| 913,440 A * | 2/1909 | Sutton | ...... | 24/908 |
| 1,531,977 A * | 3/1925 | Ritch et al. | ...... | 254/388 |
| 1,620,436 A * | 3/1927 | Burmeister | ...... | 43/44.85 |
| 1,844,652 A * | 2/1932 | Harley | ...... | 43/44.85 |
| 1,895,301 A * | 1/1933 | Vandermark | ...... | 43/44.83 |
| 1,905,449 A * | 4/1933 | Dunn | ...... | 43/44.85 |
| 2,033,701 A * | 3/1936 | Gibbs | ...... | 43/44.84 |
| 2,060,007 A * | 11/1936 | Galbraith | ...... | 43/44.85 |
| 2,150,074 A * | 3/1939 | Mclure | ...... | 24/908 |
| 2,466,939 A * | 4/1949 | Fowler | ...... | 43/44.85 |
| 2,545,326 A * | 3/1951 | Westfall et al. | ...... | 43/42.74 |
| 2,555,397 A | 6/1951 | Coward | | |
| 2,564,260 A * | 8/1951 | Houser | ...... | 43/27.4 |
| 2,716,036 A * | 8/1955 | Fenell | ...... | 43/44.83 |
| 2,718,087 A * | 9/1955 | Cheesebrew | ...... | 43/44.84 |
| 2,756,478 A * | 7/1956 | Morrissey | ...... | 24/908 |
| 2,762,155 A * | 9/1956 | Cothern | ...... | 43/27.4 |
| 2,763,089 A * | 9/1956 | McDonald | ...... | 43/44.83 |
| 2,775,842 A * | 1/1957 | McCode | ...... | 43/44.81 |
| 2,857,704 A * | 10/1958 | Teichi | ...... | 43/44.85 |
| 2,908,989 A * | 10/1959 | Povinelli et al. | ...... | 43/42.74 |
| 2,929,168 A * | 3/1960 | Furuto | ...... | 43/44.84 |
| 3,081,577 A * | 3/1963 | Brown | ...... | 43/27.4 |
| 3,148,423 A * | 9/1964 | Anspach | ...... | 43/44.83 |
| 3,160,979 A * | 12/1964 | Bissell | ...... | 43/44.85 |

(Continued)

*Primary Examiner*—Darren W. Ark
(74) *Attorney, Agent, or Firm*—Mark Brown

(57) ABSTRACT

A trotline leader system for fishing including a trotline, with a plurality of clips, hangers, drop lines, and fishing hooks, each clip including a head portion, a neck and a base and each hanger includes a head, a shank and an eyelet. The head portion is connected to the neck which extends from the base which is adapted to receive the hanger head. The hanger head is connected to the shank which connects and seperates the eyelet from the head. The head portion includes a tab, a channel, a slot and an apeture, the tab extending from the head and forming the channel with the base, the channel leading to the slot which guides the trotline into the apeture. Each drop line is connected to and extends from the hanger eyelet to each fishing hook. In addition, the trotline may optionally include plastic beads or spherical weights to separate and secure each clip to the trotline.

1 Claim, 4 Drawing Sheets

U.S. PATENT DOCUMENTS

| | | | |
|---|---|---|---|
| 3,164,922 A * | 1/1965 | Kearns et al. | 43/44.85 |
| 3,200,459 A * | 8/1965 | Hartman | 43/44.83 |
| 3,292,298 A * | 12/1966 | Mullikin | 43/44.84 |
| 3,435,552 A * | 4/1969 | Caldwell | 43/27.4 |
| 3,453,703 A * | 7/1969 | Wilson | 43/44.85 |
| 3,533,184 A * | 10/1970 | Kerr | 43/44.84 |
| 3,654,723 A * | 4/1972 | Mercer | 43/27.4 |
| 4,010,569 A * | 3/1977 | Finley et al. | 43/44.83 |
| 4,064,604 A * | 12/1977 | Hartman | 43/44.83 |
| 4,092,796 A * | 6/1978 | Adams | 43/44.83 |
| 4,321,766 A * | 3/1982 | Henderson | 43/27.4 |
| 4,790,104 A * | 12/1988 | Dorsey | 43/44.85 |
| 4,825,585 A * | 5/1989 | Lefebvre | 43/27.4 |
| 4,829,696 A * | 5/1989 | Sorensen | 43/42.74 |
| 4,930,250 A | 6/1990 | Carson | |
| 4,945,671 A * | 8/1990 | Jonsson | 43/44.84 |
| 5,083,394 A * | 1/1992 | Harwig | 43/44.83 |
| 5,107,618 A | 4/1992 | Cummings et al. | |
| 5,251,396 A * | 10/1993 | Haigh | 43/42.74 |
| 5,577,339 A * | 11/1996 | Haigh | 43/42.74 |
| 5,611,169 A * | 3/1997 | Mayer | 43/44.84 |
| 5,666,759 A * | 9/1997 | Thormodsen et al. | 43/42.74 |
| 5,771,625 A * | 6/1998 | Savaglia | 43/42.74 |
| 5,926,996 A * | 7/1999 | Frazier | 43/44.84 |
| 6,122,858 A | 9/2000 | Beaston | |
| 6,508,030 B1 * | 1/2003 | Søvik | 43/42.74 |
| 6,513,278 B1 * | 2/2003 | Jørgensen | 43/44.84 |
| 6,691,450 B1 * | 2/2004 | Glavinich | 43/44.83 |

\* cited by examiner

TROTLINE LEADER SYSTEM

BACKGROUND OF THE INVENTION

The present invention generally relates to trotline fishing equipment and, more particularly, to a system for securing a leader to a trotline.

Trotlines are known in the art. A trotline is a long, heavy fishing line to which several leader lines are attached in series. At the end of each leader line a fishing hook is attached. Trotlines are typically used along streams or near a shore of a lake. A trotline is typically anchored at both ends and the leaders or drop lines are attached at intervals of two to six feet. A bait is attached to the hook at the end of each leader.

A trotline may be several feet to several hundred feet long with a typical leader length of approximately 18–24 inches. A trotline may be set by anchoring each end to opposite banks of a stream. A fisherman baits each of the hooks along the trotline. Weights may be attached at intervals to the trotline to sink the entire trotline below the surface of the stream.

The fisherman places the trotline in the water and baits it in the evening or morning typically and may run the line once or twice a day, removing any fish that have been caught and replacing the bait that is missing.

The leaders are typically tied to the main line at spaced apart intervals. Metal clips have also been used to attach the leaders to the main line. Tied leader lines present a problem with replacing broken leaders and with changing the spacing of the leaders along the main line. Metal clips may be more easily adjusted but may slip on the main line and are prone to rusting especially in a harsh environment such as salt water. The tied or metal clipped dropped lines may become twisted or misaligned with one or more of these clips or ties presenting handling problems to the fisherman.

SUMMARY OF THE INVENTION

The present invention includes a clip to attach a drop line or leader to the main line of a trotline. The clip snaps onto the trotline and freely swivels about the longitudinal axis of the trotline. Plastic beads or spherical lead weights attached to the trotline provide spacings for the clips along the trotline. An eyelet extends through the base of the clip for attachment of the drop line and hook. The eyelet freely swivels or rotates in the base of the clip.

DETAILED DESCRIPTION

Figure 1:
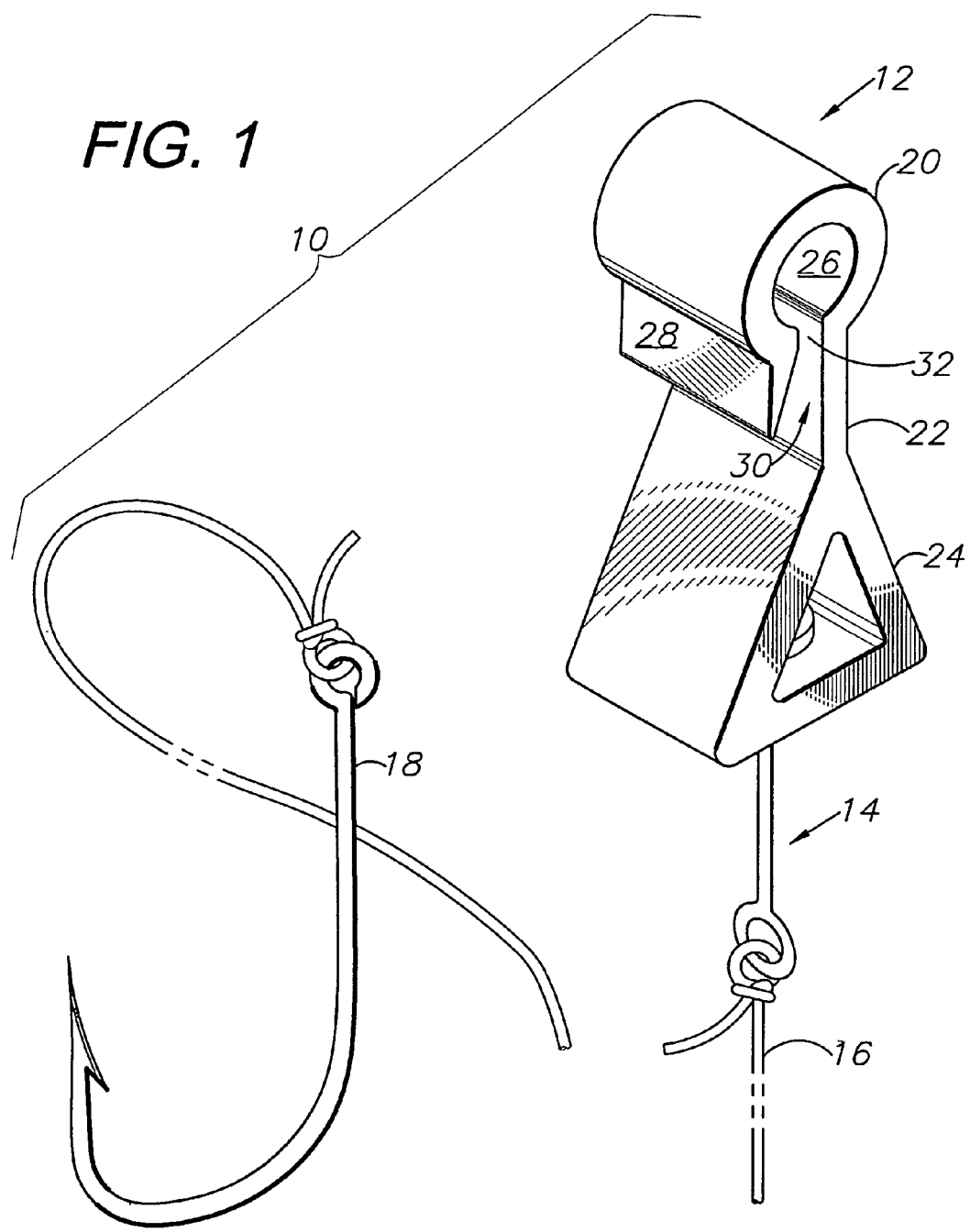
FIG. 1 is an enlarged perspective view of the trotline leader system of the present invention.

Referring to FIG. 1, the trotline leader system of the present invention is generally indicated by reference numeral 10. Trotline leader system 10 includes a clip 12, a hanger 14, drop line 16 and fishing hook 18. Drop line 16 and hook 18 are standard fishing equipment known in the art.

Clip 12 includes a head portion 20, a neck 22 and a base 24. The head portion 20 is generally tubular with a slotted aperture 26. A tab 28 extending from head portion 20 forms a channel 30 with base 24 leading to slot 32 and aids in guiding a trotline into slot 32 of aperture 26. Channel 30 is generally wider than slot 32.

Figure 2:
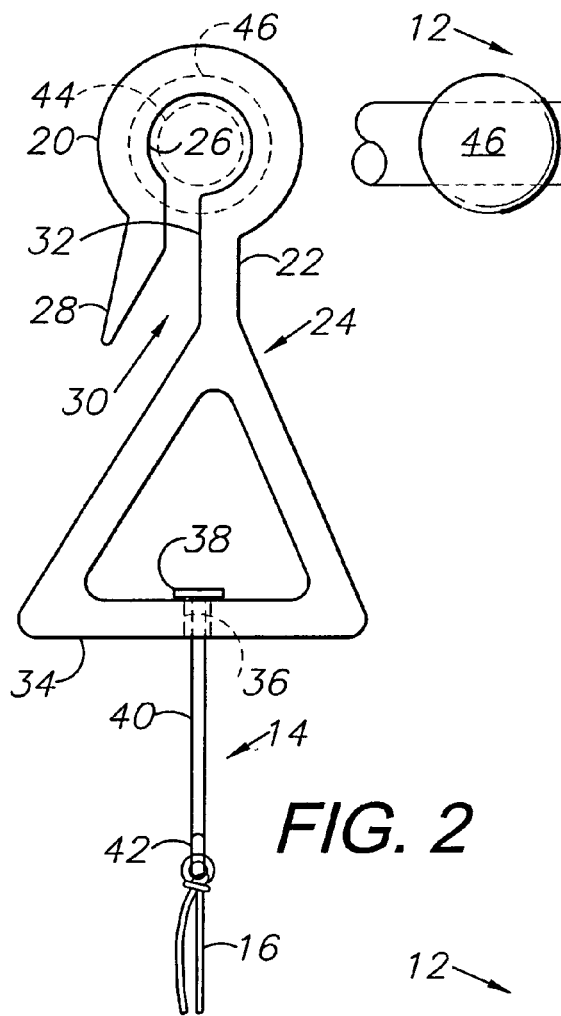
FIG. 2 is a side elevational view of the clip and hanger of FIG. 1.
Figure 5:
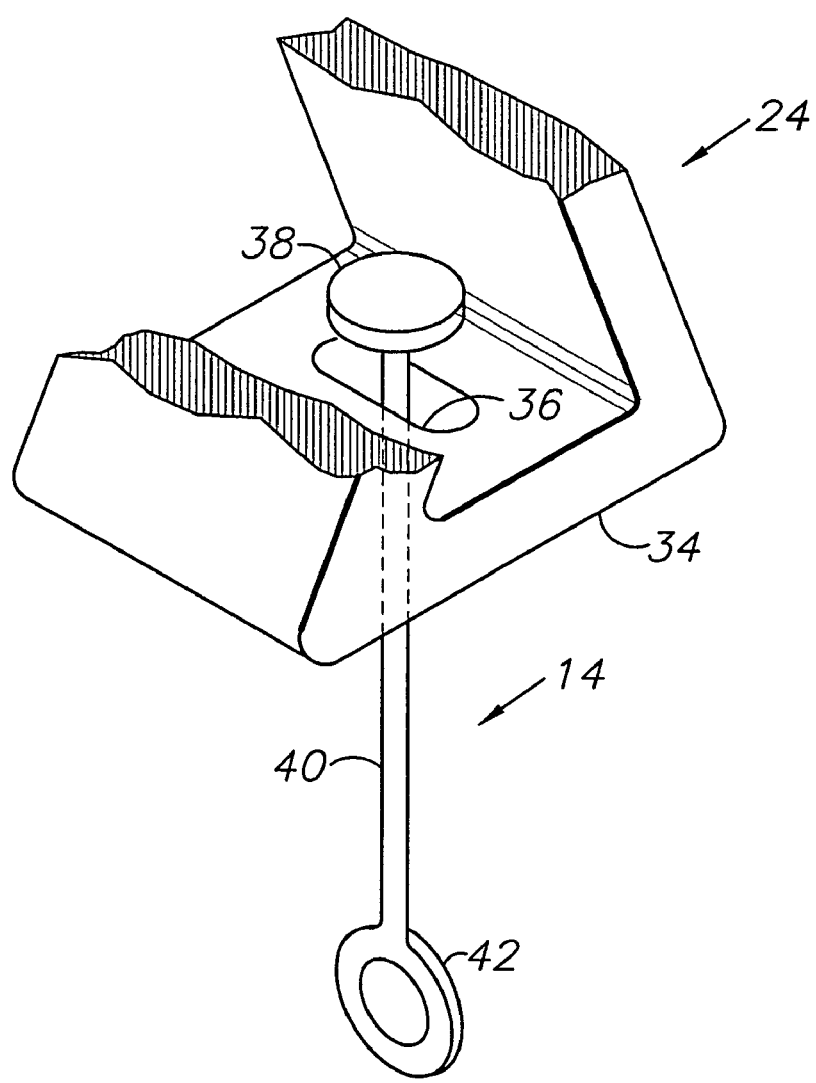
FIG. 5 is an enlarged partial sectional perspective view of the clip of FIG. 1.

Referring to FIGS. 2 and 5, the base 24 of clip 12 is generally a triangularly-shaped tube. The bottom 34 of base 24 includes a slot 36. Hanger 14 includes a head 38, a shank 40 and eyelet 42. The head 38 of hanger 14 is attached to the shank 40 opposite eyelet 42. Head 38 is generally disk-shaped with a diameter grater than the width of slot 36, which is greater than the width of shank 40. The length of slot 36 is sized to allow the eyelet 38 of hanger 14 to pass through the slot 36. When the hanger 14 is inserted in the slot 36, the hanger may freely rotate about the axis of rotation of the shaft 40. The head 38 of hanger 14 prevents the hanger 14 from pulling through the slot 36 in the base 24 of clip 12.

Figure 3:
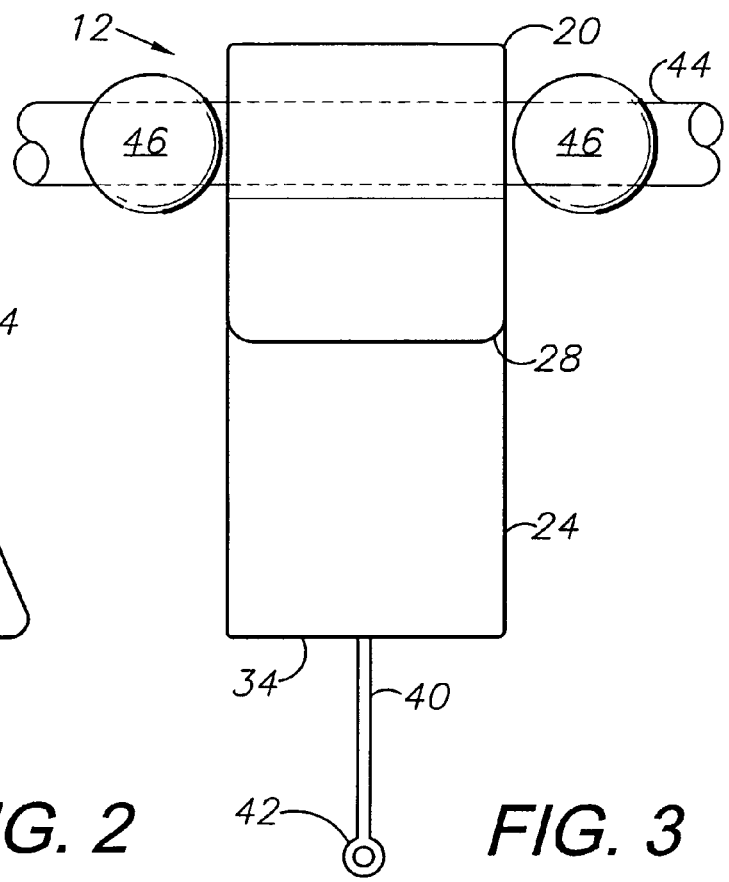
FIG. 3 is a front elevational view of the clip and hanger of FIG. 2 with retaining beads shown attached to the trotline.
Figure 4:
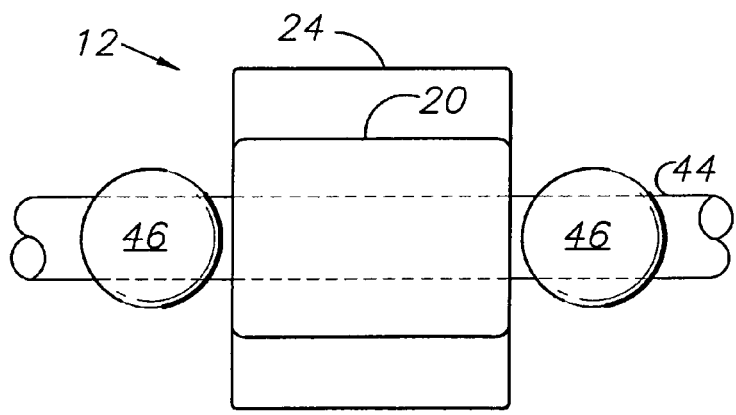
FIG. 4 is a top view of FIG. 3.

Referring to FIGS. 2–4, clip 12 is attached to a trotline 44. A pair of spaced-apart beads 46 are secured to trotline 44 on each side of clip 12. The beads 46 may be attached at regular intervals along trotline 44 to spaced apart the leader lines 16 attached to separate clips 12. The spacing of beads 46 is slightly greater than the width of clip 12 to allow clip 12 to freely pivot about trotline 44. The beads 46 may be plastic and secured to trotline 44 by a glue, or hot molded onto trotline 44, for example. The beads 46 may be spherical lead weights commonly used in fishing and crimped to trotline 44 on each side of clip 12.

Figure 6:
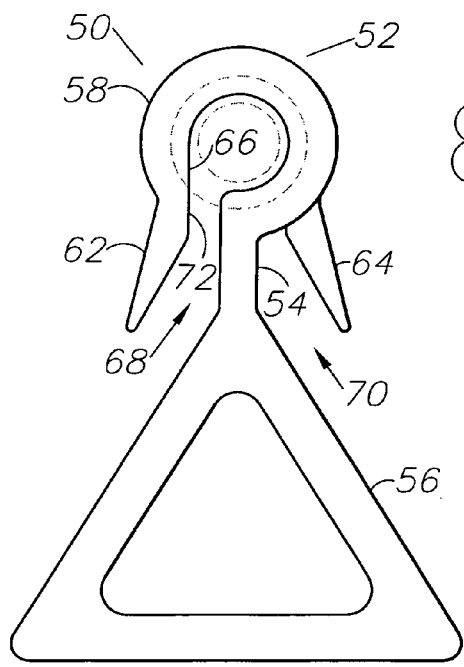
FIG. 6 is a side elevational view of an alternate clip with a split end.
Figure 7:
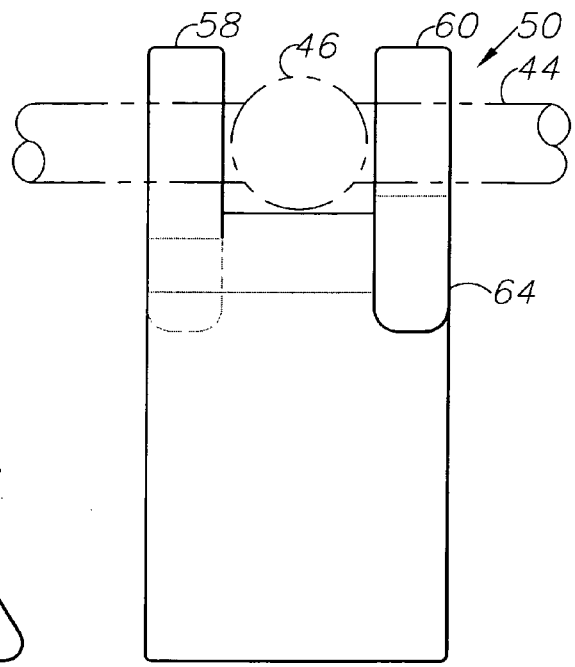
FIG. 7 is a front elevational view of the clip of FIG. 6.
Figure 8:
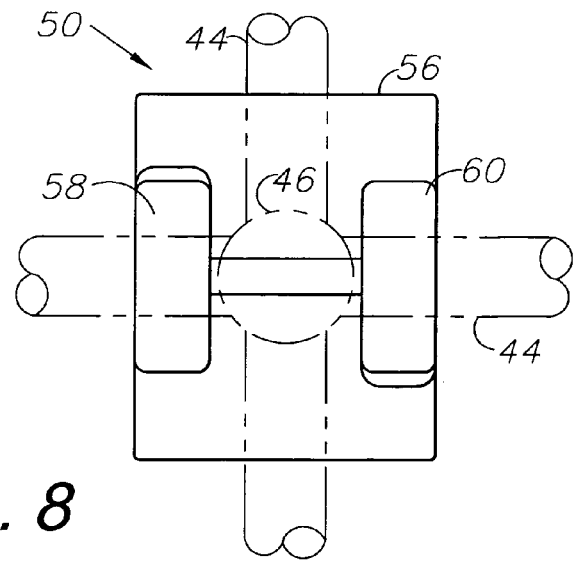
FIG. 8 is a top view of the clip of FIG. 6.

Referring to FIGS. 6–8, an alternate embodiment of a clip is generally indicated by reference numeral 50. Clip 50 includes a head portion 52, a neck 54 and a base 56. The neck 54 and base 56 of clip 50 are similarly constructed as the neck 22 and base 24 of clip 12 discussed hereinabove.

Head portion 52 includes split ends 58 and 60. Split ends 58 and 60 include opposing tabs 62 and 64 extending from its respective head portion. Each of the split ends 58 and 60 includes a slotted aperture 66 (not shown for split end 60), which transitions into a channel 68 and 70, which are formed between tabs 62 and 64 and base 56, respectively.

Clip 50 may be positioned on trotline 44 by first inserting trotline 44 through one channel 68 and slot 72 into aperture 66 then through the other channel 70 and slot (not shown) into the other aperture (not shown). A single retaining bead 46 may fit between the split ends 58 and 60 to prevent the clip 50 from sliding along trotline 44.

Typically, the diameter of trotline 44 is greater than the width of the slots in each of the apertures. However, the diameter of the trotline is less than the diameter of the apertures to allow the clips to pivot about the trotline 44. This free pivoting helps prevent the leaders and trotline from tangling or twisting.

When the clips 12 or 50 are placed on a trotline 44, the tabs 28, or 62 and 64 spread to expand the respective channel and slot to allow passage of the trotline 44. Once the trotline 44 is in the aperture, the tabs 28 or 62 and 64 spring back to their resting position to lock the trotline 44 within the aperture, until forcibly removed by a fisherman.

The clips may be constructed of nylon or other plastic material. The clips may be extruded and cut to size or may be injection molded, for example. The hanger may be constructed of fishing grade brass or steel, for example.

It will be appreciated that while certain exemplary aspects and embodiments of the invention are shown and described herein, numerous other aspects and embodiments are within the scope of the invention, which is not to be limited to the specific examples shown and described.

The invention claimed is:

1. A trotline leader system comprising:

a trotline;

multiple clips adapted to receive the trotline, each said clip including a generally tubular head portion which includes a first end, a second end, and a slotted aperture for receiving the trotline, a generally triangular base, a neck connecting said first end of said head portion and said generally triangular base, said neck extending upwardly from an apex of said triangular base to said head portion, a tab extending from said second end of the head portion, wherein said neck, head portion, and tab are entirely located outside a perimeter defined by said triangular base, a channel formed between said tab and said base, a slot formed between an inner surface of said neck and an inner surface defined by said head portion and said tab, said inner surfaces being generally parallel to each other, said channel terminates at said slot, said channel being generally wider than said slot, said channel being adapted to guide said trotline into said slotted aperture through said slot, and said base includes a bottom having a slot;

multiple hangers received by the slot in each said base bottom, each said hanger including a generally disk shaped head, a shank and an eyelet, said shank having a shaft with a rotational axis, the shank connected to and separating the head and the eyelet;

wherein the shank and the eyelet are adapted to be inserted into the bottom slot of the base, the slot being wider than the eyelet and narrower than the head, the head being restrained by the base, the hanger being permitted to rotate about the rotational axis of the shaft when the eyelet and the shaft are inserted through the bottom slot of the base;

a plurality of drop lines, each drop line proximate end tied to the hanger eyelet and each drop line distal end tied to a fishing hook; and a plurality of beads for spacing apart and securing the clip on the trotline wherein said beads are fixedly secured to the trotline.

* * * * *